US012611967B2

(12) United States Patent　　　　　(10) Patent No.:　US 12,611,967 B2
Li et al.　　　　　　　　　　　　　　　(45) Date of Patent:　Apr. 28, 2026

(54) SYSTEM AND METHOD FOR CABIN RECONFIGURATION MOTION PLANNING

(71) Applicant: Ford Global Technologies, LLC, Dearborn, MI (US)

(72) Inventors: Owen Li, Ann Arbor, MI (US); John Craig Elson, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 125 days.

(21) Appl. No.: 18/771,193

(22) Filed: Jul. 12, 2024

(65) Prior Publication Data

US 2026/0014905 A1　　Jan. 15, 2026

(51) Int. Cl.
B60N 2/02　　　(2006.01)
B60N 2/005　　(2006.01)
B60N 2/14　　　(2006.01)

(52) U.S. Cl.
CPC ........... B60N 2/0248 (2013.01); B60N 2/005 (2013.01); B60N 2/14 (2013.01)

(58) Field of Classification Search
None
See application file for complete search history.

(56) References Cited

U.S. PATENT DOCUMENTS

| | | | |
|---|---|---|---|
| 9,815,388 | B1 | 11/2017 | Lindsay |
| 10,040,373 | B2 | 8/2018 | Rawlinson et al. |
| 10,300,832 | B1 | 5/2019 | Folks et al. |
| 10,372,130 | B1 | 8/2019 | Kaushanksy et al. |
| 10,611,269 | B1 | 4/2020 | Larner et al. |
| 10,720,059 | B2 | 7/2020 | Bartel |
| 10,730,407 | B2 | 8/2020 | Guy et al. |
| 11,348,466 | B2 | 5/2022 | Bartel |
| 11,642,985 | B2 | 5/2023 | D'Eramo et al. |
| 2012/0173089 | A1* | 7/2012 | Maeda ................. B60N 2/0248 701/49 |
| 2018/0186266 | A1 | 7/2018 | Fitzpatrick et al. |
| 2019/0126786 | A1 | 5/2019 | Dry et al. |
| 2020/0130546 | A1* | 4/2020 | Foltin .................. B60N 2/6673 |
| 2022/0219570 | A1* | 7/2022 | Ohno ....................... B60N 2/01 |
| 2024/0001869 | A1 | 1/2024 | Park et al. |

\* cited by examiner

*Primary Examiner* — Lail A Kleinman
(74) *Attorney, Agent, or Firm* — Vichit Chea; Price Heneveld LLP

(57)　　　　　　ABSTRACT

A system for controlling a reconfigurable seating arrangement in a vehicle includes memory storing a plurality of cabin modes including a predetermined location and configuration for each of a plurality of moveable interior components, each stored as nodes in a network model. The nodes are connected by edges extending between ones of the nodes selected as possible successive cabin modes with associated edge cost values. A controller receives a selected one of the plurality of cabin modes and determines a first transition sequence between a current one of the cabin modes and the selected cabin mode by identifying a first one of the nodes that corresponds with the current cabin mode and a second one of the nodes that corresponds with the selected cabin mode. The controller moves at least one of the moveable interior components according to the first transition sequence.

20 Claims, 7 Drawing Sheets

SYSTEM AND METHOD FOR CABIN RECONFIGURATION MOTION PLANNING

FIELD OF THE DISCLOSURE

The present disclosure generally relates to systems and methods for automating the reconfiguration of a vehicle cabin and, more specifically, to a system that automates path finding by modeling cabin configurations in a network as nodes connected by edges.

BACKGROUND OF THE DISCLOSURE

Motion planning of cabin transitions is currently performed manually and the process can be optimized to make the transitions more efficient. There is also a need for automated motion planning of cabin transitions that would allow the user to create their own custom modes that optimizes path planning, such as reducing the need to transition to a "home" state as an intermediate step regardless of the final desired configuration, resulting additional time for reconfiguration and user inconvenience.

SUMMARY OF THE DISCLOSURE

According to one aspect of the present disclosure, a system for controlling a reconfigurable seating arrangement in a vehicle includes a vehicle-human machine interface, a memory storing a plurality of cabin modes characterized by a predetermined location and configuration for each of a plurality of moveable interior components within an interior of a vehicle, and a controller in communication with the memory and the vehicle-human machine interface. The controller receives an indication of a selected one of the plurality of cabin modes from the vehicle-human machine interface and determines a first transition sequence between a current one of the cabin modes and the selected one of the cabin modes and assigns a first transition cost value to the first transition sequence based on at least one of a first transition time or a first number of movements associated with each of the plurality of moveable interior components in reconfiguring the seating arrangement from the current cabin mode to the selected cabin mode. The controller also determines a second transition sequence between a current one of the cabin modes and the selected one of the cabin modes, assigns a second transition cost value to the second transition sequence based on at least one of a second transition time or a second number of movements associated with each of the plurality of moveable interior components in reconfiguring the seating arrangement from the current cabin mode to the selected cabin mode, and moves at least one of the moveable interior components in at least one of a location or a configuration according to one of the first and second transition sequences based on a determination of the lower of the first transition cost and the second transition cost, respectively.

Embodiments of the first aspect of the invention can include any one or a combination of the following features:
the first transition sequence can be determined based on a known path of travel for each of the plurality of moveable interior components during a change in at least one of location or configuration among a set of possible locations and configurations and comparing the known paths of travel for selected ones of the plurality of moveable interior components responsive to a change in the at least one of location or configuration between the current configuration and the selected configuration.
the first transition sequence can be determined based on eliminating potential transition sequences that include interference between the known paths of travel for selected ones of the plurality of moveable interior components.
the plurality of cabin modes can be stored in the memory as nodes in a network model, the nodes being connected by edges extending between ones of the nodes selected as possible successive cabin modes.
the network model can further include edge cost values associated with at least one of an edge transition time or an edge configuration movement count between nodes.
the first transition sequence can be determined by identifying a first one of the nodes that corresponds with the current cabin mode and a second one of the nodes that corresponds with the selected cabin mode.
the first transition sequence can further be determined by identifying a third one of the nodes that is determined to be a first intermediate transition step between the first node and the second node, and the first transition cost value can be determined as a respective edge cost value between the first node and the third node.
the first transition sequence can further be determined by identifying a fourth one of the nodes that is determined to be a second intermediate transition step between the first node and the second node, and a second transition cost value can be determined as a sum of respective edge cost values between the first node and the fourth node and between the fourth node and the second node.
at least one of the moveable interior components can be a vehicle seat that is movable along a track within the vehicle so as to be moveable between the predetermined locations associated with each of the plurality of cabin modes and rotatable about a base mounted on the track so as to be configurable between the predetermined configurations associated with each of the plurality of cabin modes.
the system can further include a first actuator operably associated between the track and the base to move the vehicle seat along the track and a second actuator operably associated between the base and an upper portion of the vehicle seat to rotate the vehicle seat about the base, and the first and second actuators can be in electronic communication with the controller.

According to another aspect of the present disclosure, a system for controlling a reconfigurable seating arrangement in a vehicle includes a vehicle-human machine interface and a memory storing a plurality of cabin modes a predetermined location and configuration for each of a plurality of moveable interior components within an interior of a vehicle. The plurality of cabin modes are each stored as nodes in a network model. The nodes are connected by edges extending between ones of the nodes selected as possible successive cabin modes, and the network model further includes edge cost values associated with at least one of an edge transition time or an edge configuration movement count between nodes. The system further includes a controller in communication with the memory and the vehicle-human machine interface. The controller receives an indication of a selected one of the plurality of cabin modes from the vehicle-human machine interface and determines a first transition sequence between a current one of the cabin modes and the selected one of the cabin modes by identifying a first one of the nodes that corresponds with the current cabin mode and a second one of the nodes that corresponds with the selected cabin mode. The controller moves at least one of the moveable interior components in at least one of a location or a configuration according to the first transition sequence.

According to another aspect of the present disclosure, a vehicle includes a reconfigurable seating arrangement within an interior of the vehicle having a plurality of moveable interior components, a vehicle-human machine interface, and a memory storing a plurality of cabin modes a predetermined location and configuration for each of the moveable interior components. The plurality of cabin modes are each stored as nodes in a network model, and the nodes are connected by edges extending between ones of the nodes selected as possible successive cabin modes. The network model further includes edge cost values associated with at least one of an edge transition time or an edge configuration movement count between nodes. The vehicle further includes a controller in communication with the memory and the vehicle-human machine interface. The controller receives an indication of a selected one of the plurality of cabin modes from the vehicle-human machine interface and determines a first transition sequence between a current one of the cabin modes and the selected one of the cabin modes by identifying a first one of the nodes that corresponds with the current cabin mode and a second one of the nodes that corresponds with the selected cabin mode. The controller moving at least one of the moveable interior components in at least one of a location or a configuration according to the first transition sequence.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
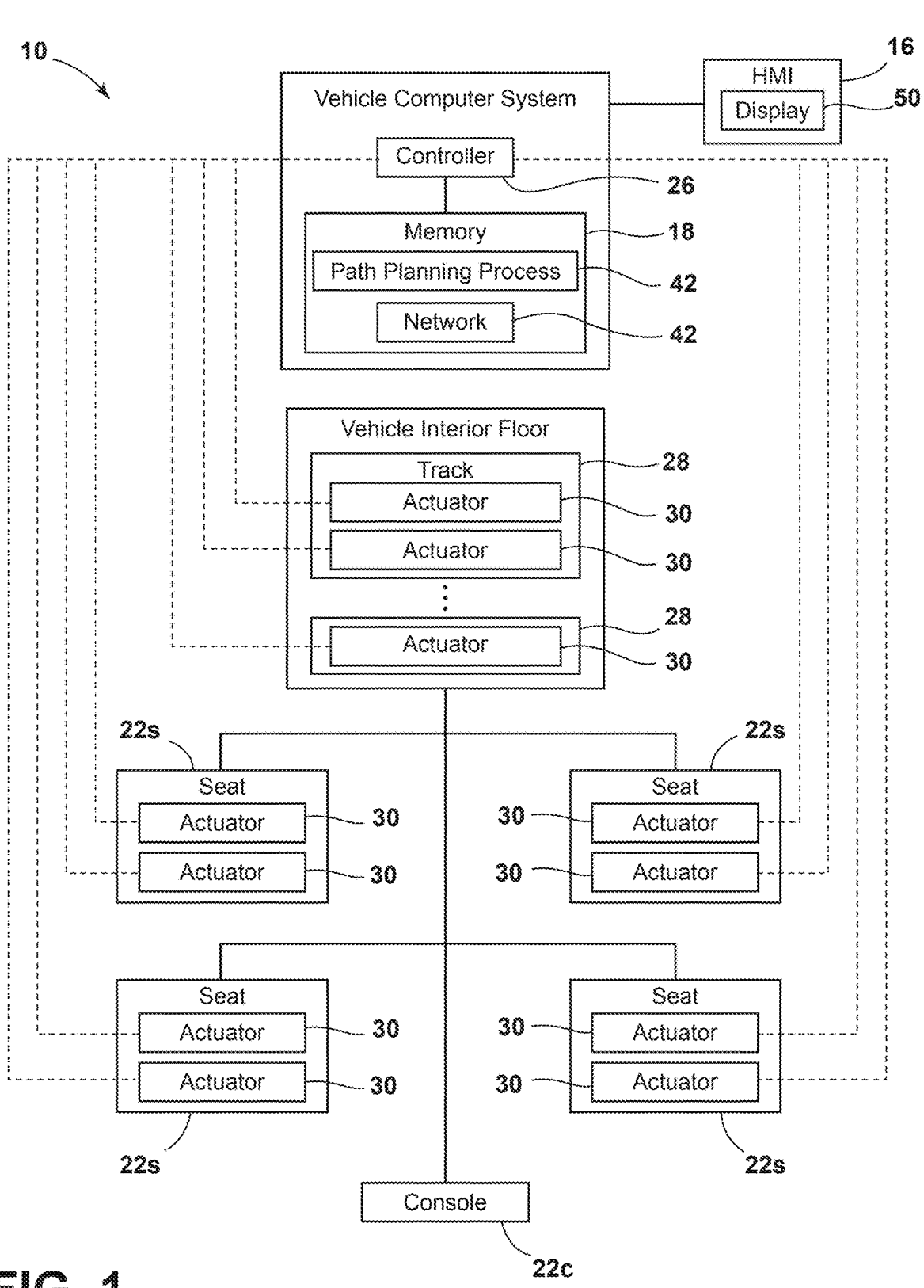
FIG. 1 is a diagram of a system for controlling a reconfigurable vehicle seating arrangement according to an aspect of the disclosure.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Ordinal modifiers (i.e., "first", "second", etc.) may be used to distinguish between various structures of the disclosed transportation rack in various contexts, but that such ordinals are not necessarily intended to apply to such elements outside of the particular context in which they are used and that, in various aspects different ones of the same class of elements may be identified with the same, context-specific ordinal. In such instances, other particular designations of the elements are used to clarify the overall relationship between such elements. Ordinals are not used to designate a position of the elements, nor do they exclude additional, or intervening, non-ordered elements or signify an importance or rank of the elements within a particular class.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the terms "about", "approximately", or "substantially" are intended to mean that a value of a parameter is close to a stated value or position. However, minor differences may prevent the values or positions from being exactly as stated. Thus, unless otherwise noted, differences of up to ten percent (10%) for a given value are reasonable differences from the ideal goal of exactly as described. In many instances, a significant difference can be when the difference is greater than ten percent (10%), except as where would be generally understood otherwise by a person of ordinary skill in the art based on the context in which such term is used.

Referring to FIG. 1, reference numeral 10 generally designates a system for controlling a reconfigurable seating arrangement 12 in a vehicle 14. The system 10 includes a vehicle-human machine interface 16, a memory 18 storing a plurality of cabin modes 20 characterized by a predetermined location and configuration for each of a plurality of moveable interior components 22 within an interior 24 of the vehicle 14. System 10 further includes and a controller 26 in communication with the memory 18 and the vehicle-human machine interface 16. The controller 26 receives an indication of a selected one of the plurality of cabin modes 20 from the vehicle-human machine interface 16 and determines a first transition sequence between a current one of the cabin modes 20 and the selected one of the cabin modes 20 and assigns a first transition cost value to the first transition sequence based on at least one of a first transition time or a first number of movements associated with each of the plurality of moveable interior components 22 in reconfiguring the seating arrangement 12 from the current cabin mode 20 to the selected cabin mode 20. The controller also determines a second transition sequence between the current one of the cabin modes 20 and the selected one of the cabin modes 20, assigns a second transition cost value to the second transition sequence based on at least one of a second transition time or a second number of movements associated with each of the plurality of moveable interior components 22 in reconfiguring the seating arrangement 12 from the current cabin mode 20 to the selected cabin mode 20, and moves at least one of the moveable interior components 22 in at least one of a location or a configuration according to one of the first and second transition sequences based on a determination of the lower of the first transition cost and the second transition cost, respectively.

Figure 2:
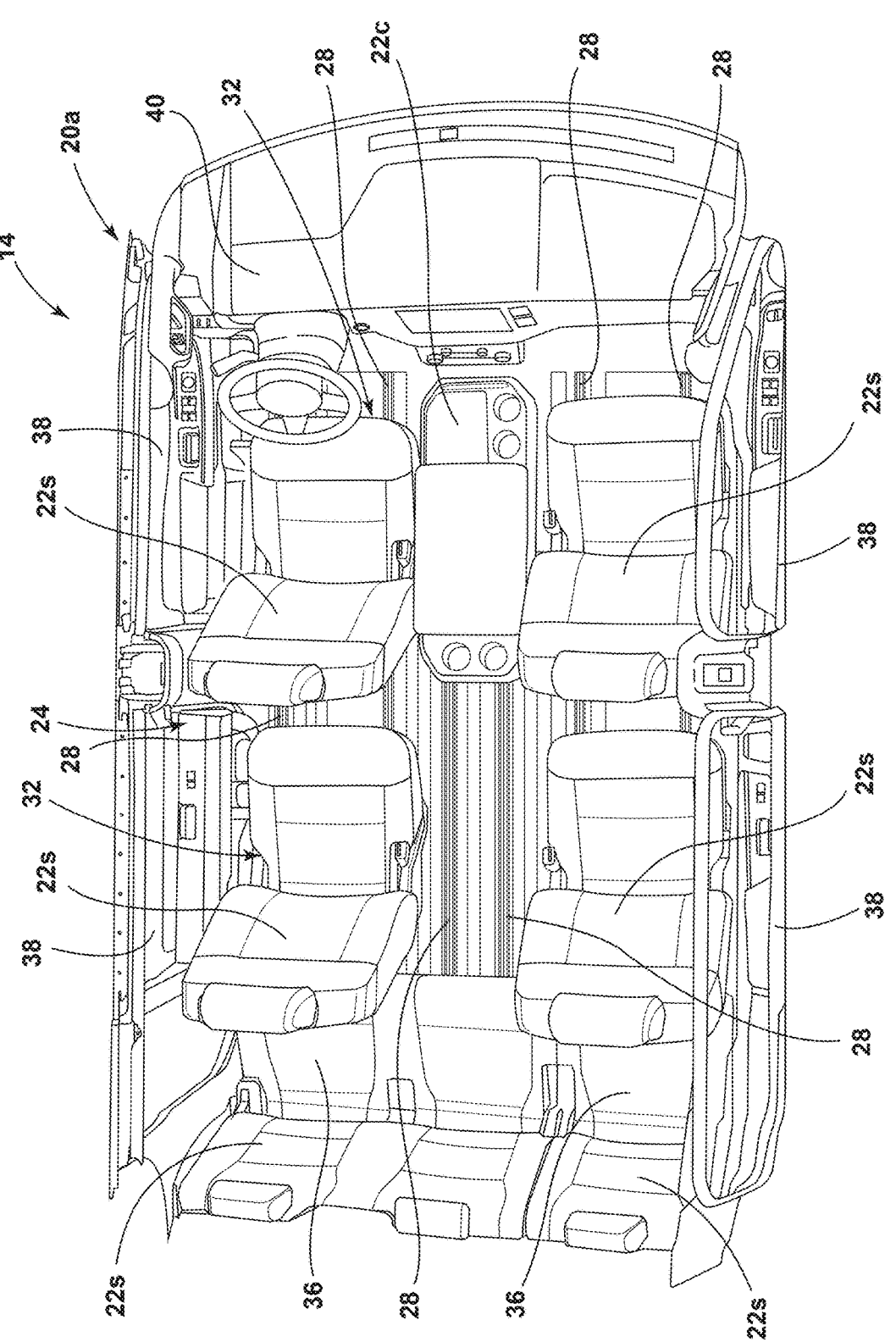
FIG. 2 is a perspective view of a reconfigurable seating arrangement in a first cabin mode.
Figure 3:
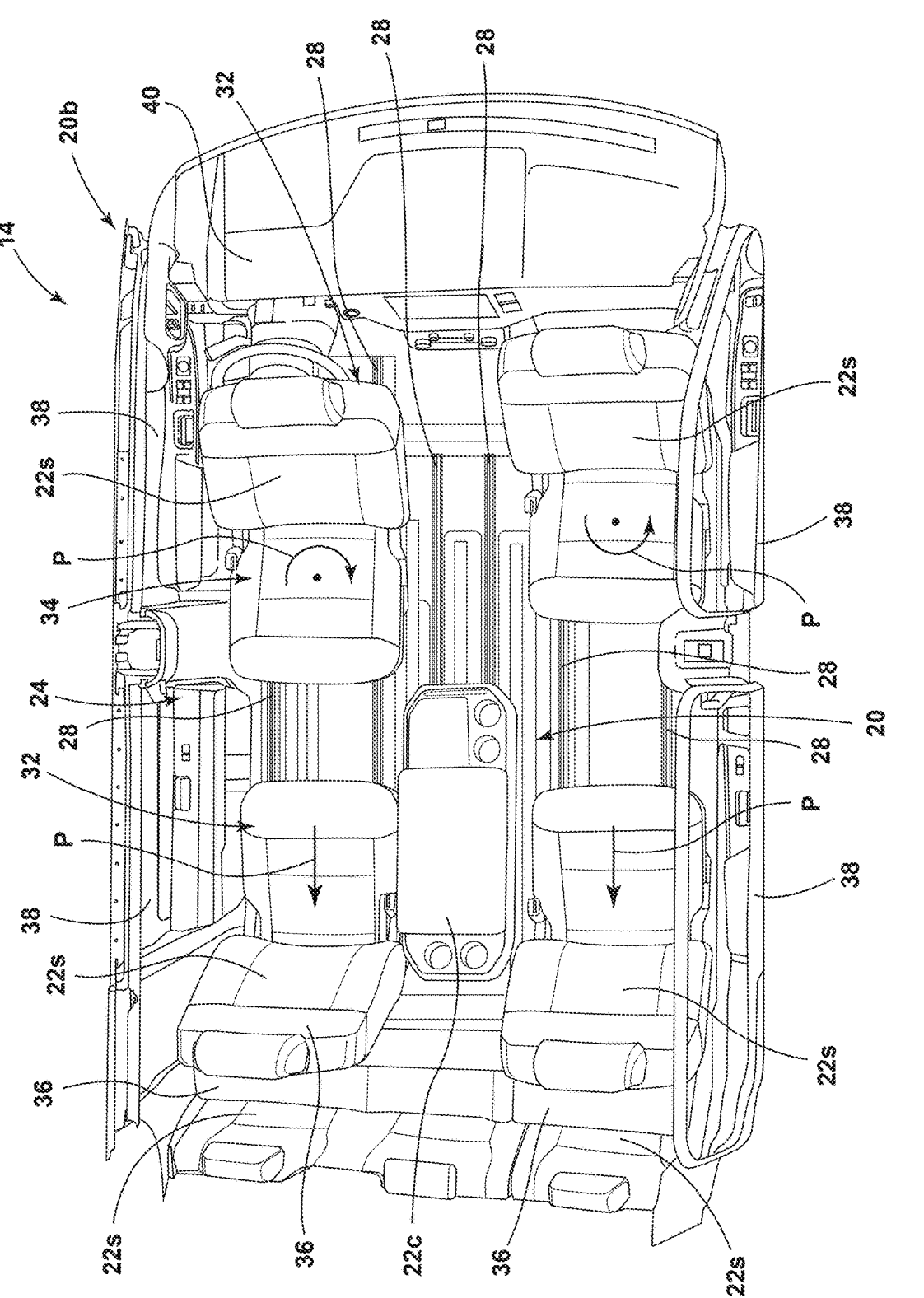
FIG. 3 is a perspective view of a reconfigurable seating arrangement in a second cabin mode.
Figure 4:
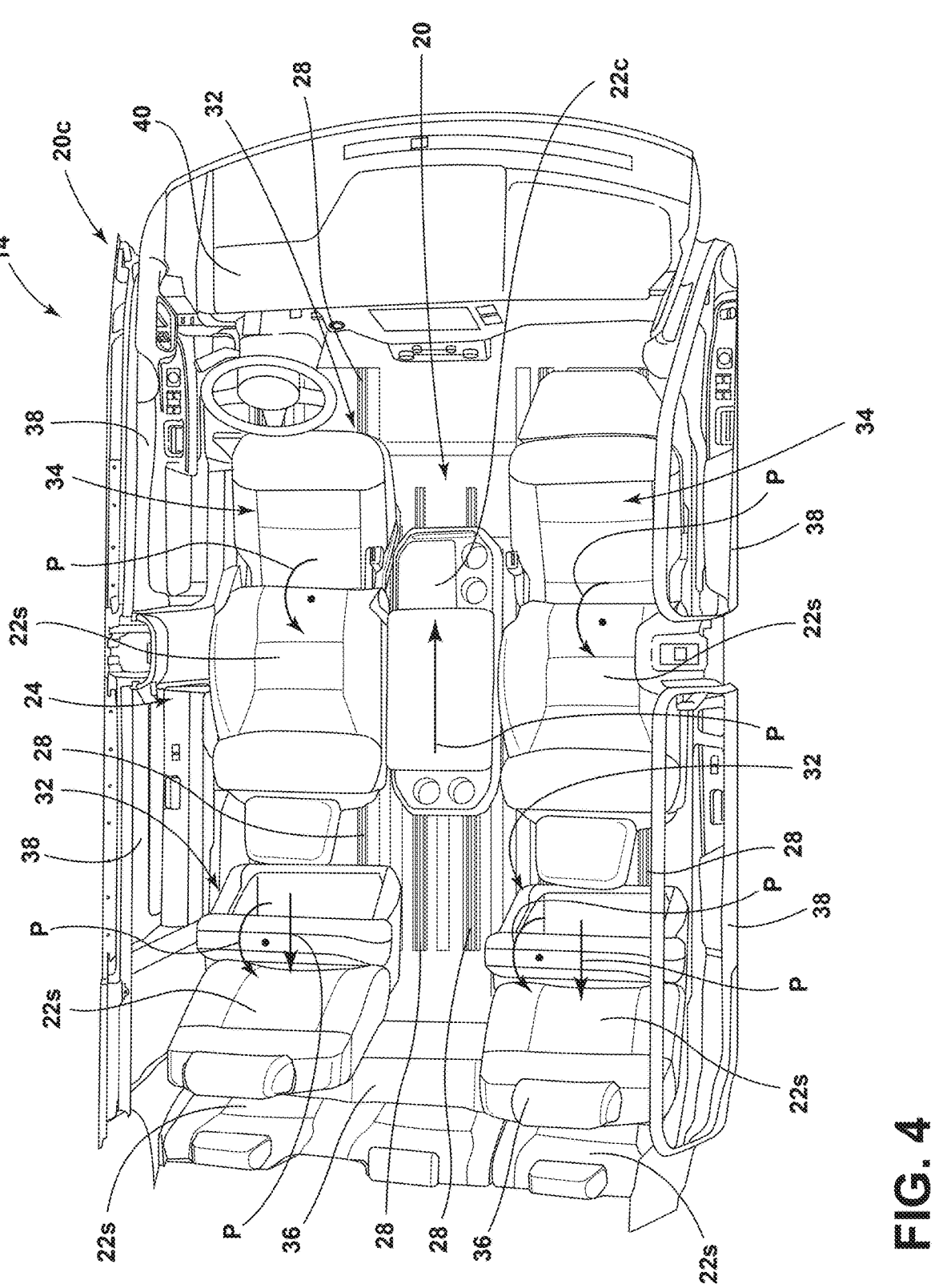
FIG. 4 is a perspective view of a reconfigurable seating arrangement in a third cabin mode.
Figure 5:
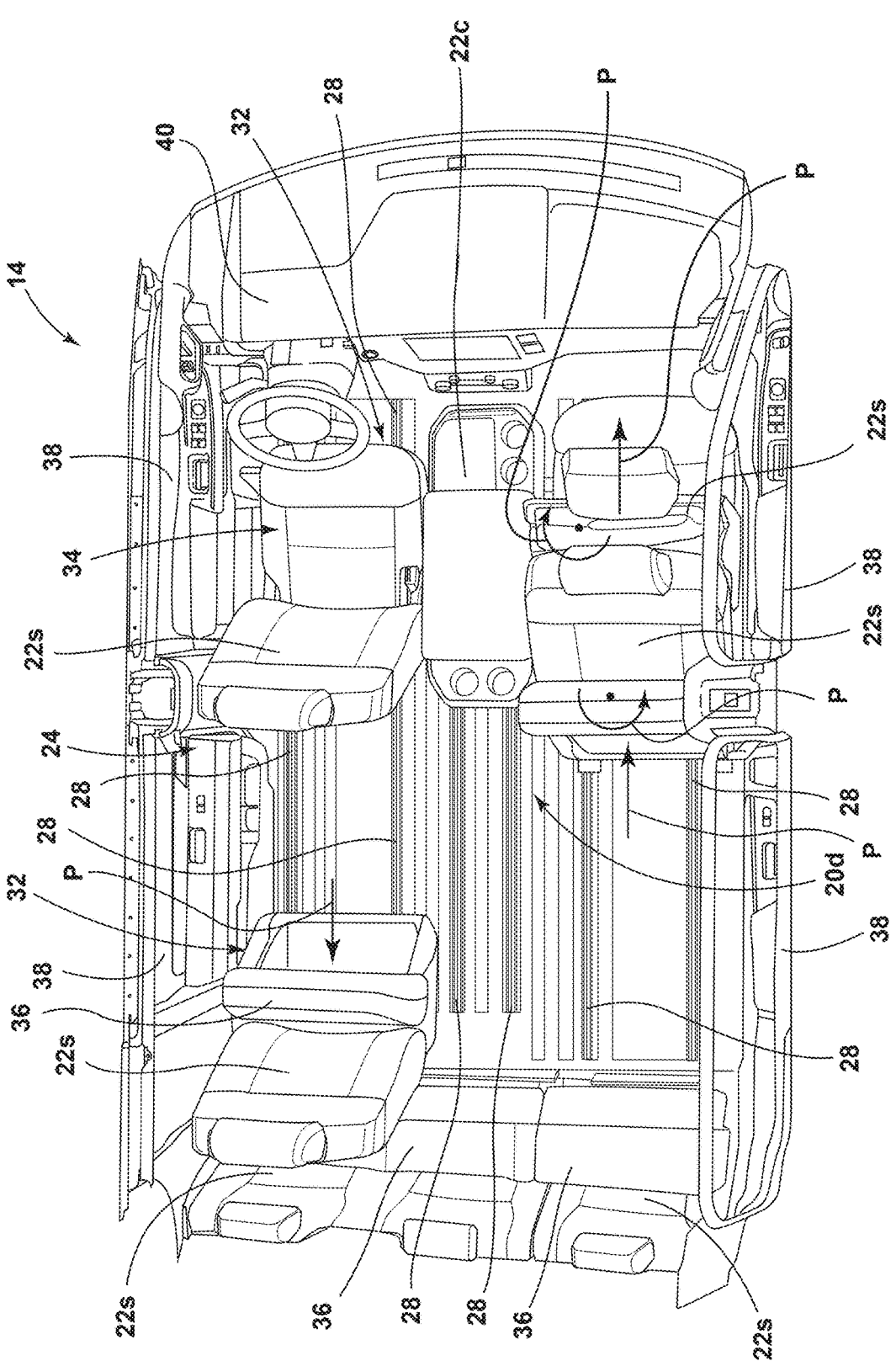
FIG. 5 is a perspective view of a reconfigurable seating arrangement in a fourth cabin mode.

As shown in the examples of FIGS. 2-5, at least one of the moveable interior components 22 can be a vehicle seat 22s that is movable along a track 28 within the vehicle 14 so as to be moveable between the predetermined locations associated with each of the plurality of cabin modes 20 and rotatable about a base 32 mounted on the track 28 so as to be configurable between the predetermined configurations associated with each of the plurality of cabin modes 20. For example, FIG. 2 shows a cabin mode 20a that can be characterized as a normal driving mode, with the seats 22s oriented toward the front of the vehicle 14 and spaced for the driver and various passengers to utilize the remaining seats 22s. FIG. 3 shows a configuration 20b that can be characterized as a conversation mode, wherein the front seats 22s are rotated 180 degrees to face the center row seats 22s, which have been moved back to adjacent the rear seats 22s. In this respect, it can be appreciated that the reconfiguration between modes 20a and 20b includes rotation of the front seats 22s and movement of the rear seats 22s along the track 28. As further shown, an additional one of the moveable interior components 22 is in the form of a console 22c that is also moveable along a track 28, the console 22c being positioned between the front seats 22s in the cabin mode 20a of FIG. 2 and positioned between the middle seats 22s, with a portion extending toward the front seats 22s in the cabin mode 20b of FIG. 3.

To cause the various movements of the moveable interior components 22 discussed above, and in further detail below, the system 10 can further include various actuators 30. In one aspect, actuators 30 can be operably associated between the track (or tracks) 28 and the moveable interior components 22 for movement of the components 22 along the various respective tracks 28. For example, actuators 30 can be operably coupled between the bases 32 to move the vehicle seats 22s along the respective track 28. Additional actuators 30 can be operably associated between the bases 32 and an upper portion 34 of the vehicle seats 22s to selectively rotate the vehicle seats 22s about the respective bases 32. In this manner, the actuators 30 can be in electronic communication with the controller 26 for selective control of the various available movements of the seats 22s, as they correspond with the available cabin modes 20. It is contemplated that the vehicle seats 22s can have additional modes of movement afforded by the construction of such seats 22s, with such movements being selectively automatically controllable by the inclusion of additional actuators 30 incorporated into the seat(s) 22s. In this manner, different seats may be controllable in different ways, including by having varying moveable features controlled by different configurations of actuators 30. In the example shown in FIG. 4, the rear-most and middle seats 22s may include cushions 36 that can rotate upwardly to accommodate increased rearward sliding of the middle seats 22s and full reclining of the front seats 22s, respectively. In various other examples, various ones of the vehicle seats 22s can include footrests that can deploy by rotation, extension, or combinations thereof, moveable armrests and/or headrests, or other such features, all of which may be controlled by various actuators (including linear or rotational actuators) within the scope of this disclosure. In this manner, it is further noted that the reclining of the front seats 22s can also be implemented by the controller 26 in the transition between the illustrated example modes, with the memory 18 including information related to the various available movements and included actuators 30, and their characteristics, for the various seats, including as associated with the various cabin modes 20. In one aspect, the actuators 30 can be the same ones used for manual movement and configuration of the seats 22s.

Generally speaking, the present system 10 can be used to control the movement involved with reconfiguring the vehicle 14 cabin, or interior 24, among the various cabin modes 20 by way of moving the interior components 22 which contain motorized long travel tracks 28, seat swivel, as discussed above, and cushion 36 flip functions along with standard motorized seat adjustment features. In general, a system 10 for controlling a so-called reconfigurable cabin will have the ability to automatically position the seats 22s and consoles 22c to enable various modes for the users, including but not limited to the "social" mode shown in FIG. 3, the cargo mode shown in FIG. 5, the drive mode shown in FIG. 2 and the like. Due to the size of an interior 24 space, the moveable interior components 22 within such reconfigurable cabins are moveable through positions where they may interfere with or contact each other (particularly when moving simultaneously) as well as the doors 38 and instrument panel 40 when transitioning between configurations. Accordingly, some form of motion planning is needed to ensure transitions happen in coordinated and timely manner so as to minimize the transition time, while allowing effective movement without contact or movement blocking of the components 22. As more modes 20 are made available or as user-defined custom modes 20 are introduced, the total number of transitions between every mode 20 grows quickly. Accordingly, the present system 10 employs an automated method for generating motion plans for transitioning between cabin modes 20.

In general, the various transitions between cabin modes 20 can be broken down into a sequence of permitted steps (i.e., without mutual contact or contact with any other vehicle interior features). A permitted step can be defined as a change in actuator 30 configuration (i.e., varying degrees of extension, rotation, etc., as applicable) for which any actuators 30 involved can move directly to their new positions, corresponding with the varying desired component 22 positions or feature configurations, in any order and at any speed without risk of contact or interference. Each step taken moves the interior components 22 to a new "state" that may or may not directly correspond with a predetermined cabin mode 20. Once the new cabin state is reached, the next permitted step in a desired sequence can be taken. Collectively, the progression through one or more cabin states connected by permitted steps constitute an available or permitted transition sequence. A permitted transition path may exist which moves the moveable components 22, as needed from an initial cabin mode 20 to a selected cabin mode 20 directly in one permitted step. In many instances, however, such a direct transition path may not exist. In such instances, multiple permitted steps through intermediate modes may be required to achieve the desired transition.

For example, with continued reference to FIGS. 2-5, a transition between the cabin mode 20a shown in FIG. 2, wherein the with the front seats 22s in a front-facing orientation corresponding with the depicted driving mode and the console 22c positioned between the front seats 22s. In this respect, to transition to a cabin mode 20b with the front seats 22s in a rear-facing position, such as that which is shown in FIG. 3, should first include moving the console 22c rearward to the position shown in FIG. 3 so that the front seats 22s can rotate (by the controller 26 directing the actuator(s) 30 associated with the rotation of the upper portions 34 on the bases 32) without interference from the console 22c. In this respect, an additional cabin mode 20 can correspond with the console 22c being positioned between the front seats 22s such that the transition sequence would include moving the console 22c rearward to allow the front seats 22s to rotate to the rearward-facing position shown in FIG. 3.

In this respect the system 10 can determine any available steps in a transition sequence between a current cabin mode 20 and a select cabin mode 20 can be determined based on a known path of travel (e.g., along the track 28 or by rotation, movement of the cushion 36, etc.) P for each of the plurality of moveable interior components 22 (or individually moveable portions) during a change in at least one of location or configuration among a set of possible locations and configurations and comparing the known paths of travel P for selected ones of the plurality of moveable interior components 22 (i.e., those for which the position changes between the current cabin mode 20 and the selected cabin mode 20 or those that are moved to accommodate movement of another components 22, which may be referred to as "involved" components 22) responsive to a change in the at least one of location or configuration between the current cabin mode 20 and the selected cabin mode 20. In this respect, a transition sequence between cabin modes 20 can be determined by the controller 26 by eliminating potential transition sequences that include interference between the known paths of travel P for involved ones of the plurality of moveable interior components 22. In this respect, the motion planning pathfinding process 42 described herein and executed by controller 26 does not require real-time position data to be transmitted, for example, between the actuators 30 and the controller 26, which reduces complexity and network traffic when implemented across a distributed controller 26 network as is common in modern vehicles. Accordingly, it is noted that the present controller 26 can refer to one of a number of vehicle controllers 26 (such as a vehicle electronic control unit ("ECU") or the like) that executes the motion planning pathfinding process 42 described herein or a collection of separate, networked controllers that are collectively responsible for executing the process 42. As discussed above, the pathfinding process 42 can operate by identifying a travel path between the current cabin mode 20 and the selected cabin mode 20 that directly transitions between such cabin modes 20 or that moves through an intermediate cabin mode 20 that represents a permitted step that allows for ultimate movement of one or more components 22 to the desired position corresponding with the selected cabin mode 20 when a direct transition does not represent a permitted step, such as in the example discussed above. It is further noted that the present system 10 requires no additional sensors (such as in-cabin cameras), reducing cost and complexity to implement. Automated motion planning by pathfinding algorithms enables more preset modes and user-defined custom modes with the same vehicle hardware, while ensuring safe and timely transitions between all known available cabin modes 20, which may be stored in the memory 18. In this respect, it is noted that some of the cabin modes 20 stored in the memory 18 may correspond with known configurations that may be useful as intermediate modes but may not directly correspond with a cabin mode 20 that is actually selectable by a user.

Figure 6:
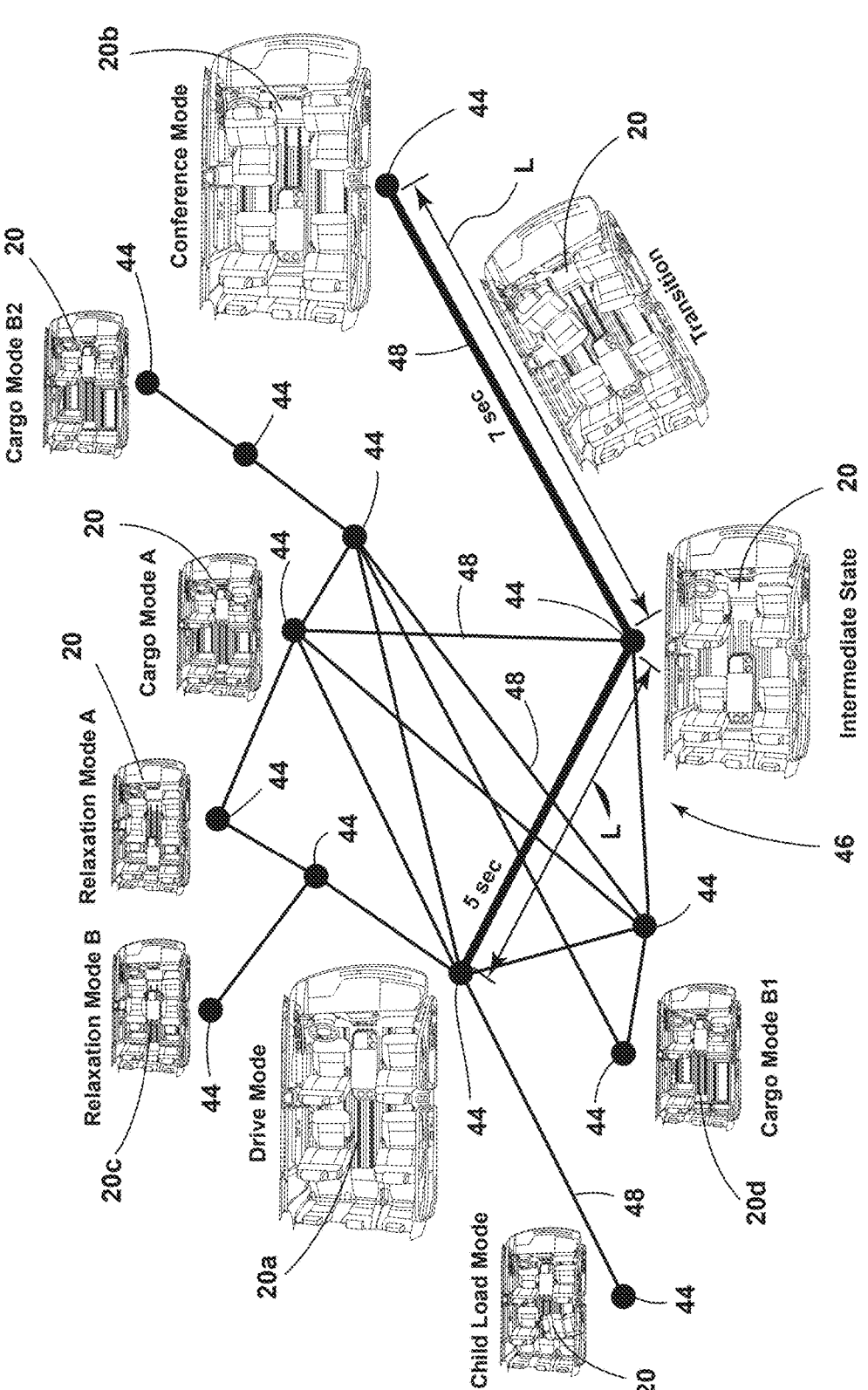
FIG. 6 is a schematic diagram of a network of cabin mode nodes connected by edges with associated cost values, useable by the system to develop transition sequences between cabin modes, according to an aspect of the disclosure.

Referring now to FIG. 6, the plurality of cabin modes 20 can be stored in the memory 18 as nodes 44 in a network model 46 (represented graphically in FIG. 6). The nodes 44 can be connected by edges 48 that extend between ones of the nodes 44 determined to be possible successive cabin modes 20, according to the criteria discussed above. In one aspect, the selection and storage in memory 18 of the edges 48 can be done by the controller 26 as a feature of the planning process 42. The network model 46 can further include edge cost values (represented graphically by the length L of the edges 48 in FIG. 6. The cost values can be associated with or otherwise determined by taking into account at least one of an edge transition time (i.e., the total time that lapses during movement of the various components 22 between nodes 44) or an edge configuration movement count (i.e., the number of steps or component 22 or feature movements) between nodes 44. In one respect, the controller 26 in determining cost values can balance both the number of movements and transition time to varying degrees. When additional cabin modes 20 are stored in memory 18, including by a manufacturer update or by way of a process that allows a user to store a new cabin mode 20, the mode 20 is stored in the memory 18 as a new node 44 that is associated with other nodes representing other cabin modes 20 to which a possible direct path is available as additional edges 48 by the system 10. The associated cost values of the new edges 48 can then be determined.

In operation, once a selected cabin mode 20 is received, the transition sequence between the current mode 20 and the selected mode 20 can be determined by identifying all nodes 44 that are directly or indirectly connected between the nodes 44 that correspond with the current cabin mode 20 and the selected cabin mode 20. In one respect, this may include identifying one or modes 20 that represent separate intermediate transition steps between the nodes 44 corresponding with the current cabin mode 20 and the selected cabin mode 20. In such instances, a potential path can be selected by determining the transition cost values associated with the possible paths (directly or through various transition modes) as a sum of respective edge cost values between the nodes 44 along each possible path. The controller 26 can then choose the sequence, among any available sequences by selecting the sequence with the lowest transition cost value. In one respect, this can be done on a step-by-step basis, with the controller 26 identifying all nodes 44 that are immediately connected with the node 44 representing the current cabin mode 20 (i.e., connected by a single edge 48), and selecting the first intermediate transition step so as to move into the mode 20 represented both the next connected node 44 having the lowest associated transition cost. If the node 44 corresponding with the first intermediate transition step does not also correspond with the selected cabin mode 20, the process is repeated by selecting the next connected node 44 between the end of the first intermediate transition sequence and the selected cabin mode 20 based on the node 44 with the lowest associated edge cost until the full transition sequence between the current mode 20 and the selected mode 20 is achieved.

As discussed above, the edges 48 can be determined as permitted transitions between cabin modes 20 according to the criteria discussed above, namely, based on the known paths of travel P for each of the plurality of moveable interior components 22 (including moveable portions thereof) during a change in at least one of location or configuration among the possible locations and configurations of each component 22. The known paths of travel P for the involved moveable interior components 22 responsive to the change in the at least one of location or configuration between the current cabin mode 20 and the selected cabin mode 20. This process can eliminate or exclude transition sequences that include or otherwise result in intersection between the known paths of travel P for the involved moveable interior components 22 (which may indicate the potential for contact or interference).

Figure 7:
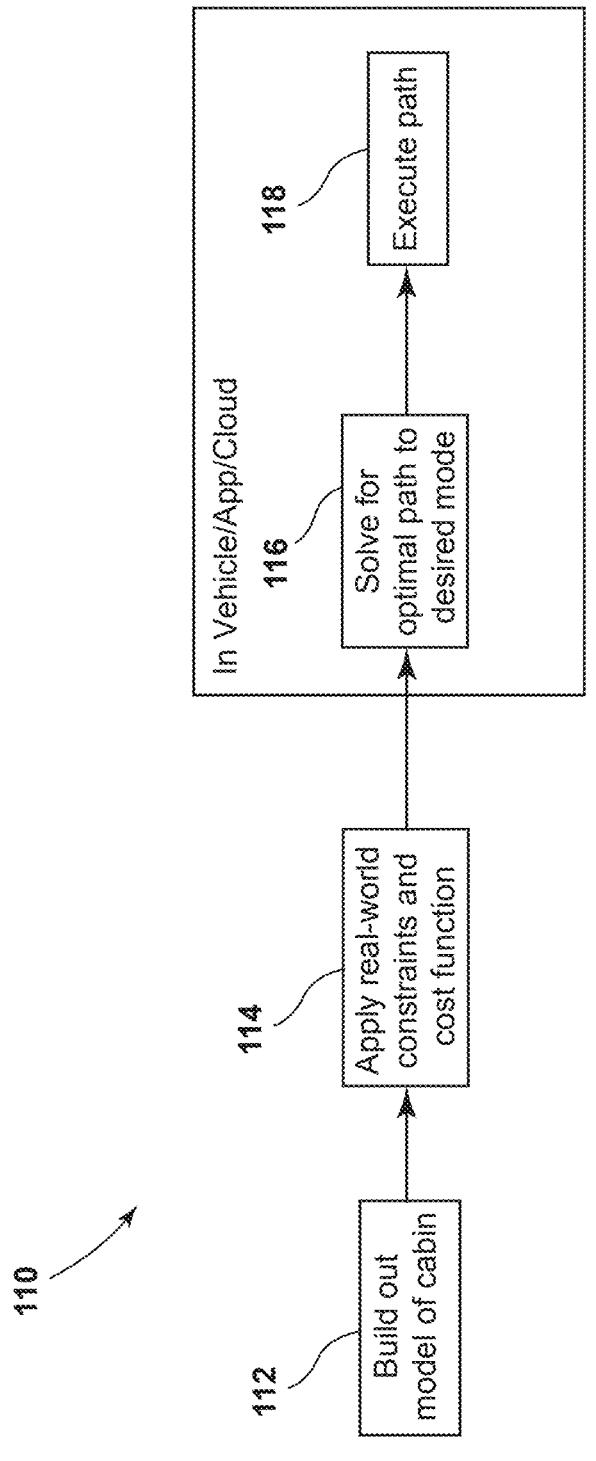
FIG. 7 is a flowchart depicting a method of system operation according to another aspect of the disclosure.

The above-described process 110 is shown in general in FIG. 7, and results in the reconfigurable cabin being modeled as a weighted graph with each possible cabin mode 20 represented as a node 44 (step 112). Again, based on the geometry of the vehicle interior 24, criteria are applied that exclude states in which the moveable components 22 interfere by movement to reconfigure or move the components 22, regardless of timing. The edges 48 are, accordingly, established between nodes 44 of the graph if they correspond to permitted steps or transitional movements. The costs are assigned to each edge 48 based on the time required to complete the transition, the number of actuators 30 involved, and/or any other aspect of the cabin transition deemed appropriate (step 114). Once the cabin model 46 is built, the system 10 can wait for indication of a selected cabin mode 20, which can be made by a user selecting a mode 20 via the HMI 16 from available options presented on a display 50. In this respect, the HMI 16 can be a component of the vehicle 14 or, for purposes of such selection, can be a smartphone connected with the vehicle 14. The pathfinding process 42 can then be used to find the optimal permitted transition path between any two states/nodes 44 based on the lowest possible total cost (step 116). The process 42 can be run on the controller 26 or, in further variations, on the user's mobile device or on an external server via a cloud-based platform. Once, the optimal path is determined, the controller 26 executes the corresponding movements in sequence through any intermediate states to arrive at the selected configuration (step 118). the path The reconfigurable cabin may then execute the path (step 118).

Notably, the system 10, in executing the above process 110, only needs reasonably accurate knowledge of the positions and configuration of the moveable components 22 such that each involved component 22, for example, can communicate to the controller 26 when it has reached its assigned position. In this respect, the controller 26 does not require knowledge, assumption, or control of actuator speed or real-time sensor data for position when actuators 30 begin or execute their respective movements.

It is to be understood that variations and modifications can be made on the aforementioned structure without departing from the concepts of the present disclosure, and further it is to be understood that such concepts are intended to be covered by the following claims unless these claims by their language expressly state otherwise.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A system for controlling a reconfigurable seating arrangement in a vehicle, comprising:

a vehicle-human machine interface;

a memory storing a plurality of cabin modes characterized by a predetermined location and configuration for each of a plurality of moveable interior components within an interior of a vehicle; and a controller in communication with the memory and the vehicle-human machine interface, the controller:

receiving an indication of a selected one of the plurality of cabin modes from the vehicle-human machine interface;

determining a first transition sequence between a current one of the cabin modes and the selected one of the cabin modes and assigning a first transition cost value to the first transition sequence based on at least one of a first transition time or a first number of movements associated with each of the plurality of moveable interior components in reconfiguring the seating arrangement from the current cabin mode to the selected cabin mode; and moving at least one of the moveable interior components in at least one of a location or a configuration according to one of the first and second transition sequences based on a determination of the lower of the first transition cost and the second transition cost, respectively.

2. The system of claim 1, wherein the first transition sequence is determined based on:

a known path of travel for each of the plurality of moveable interior components during a change in at least one of location or configuration among a set of possible locations and configurations; and comparing the known paths of travel for selected ones of the plurality of moveable interior components responsive to a change in the at least one of location or configuration between the current configuration and the selected cabin mode.

3. The system of claim 2, wherein the first transition sequence is determined based on eliminating potential transition sequences that include interference between the known paths of travel for selected ones of the plurality of moveable interior components.

4. The system of claim 1, wherein the plurality of cabin modes are stored in the memory as nodes in a network model, the nodes being connected by edges extending between ones of the nodes selected as possible successive cabin modes.

5. The system of claim 4, wherein the network model further includes edge cost values associated with at least one of an edge transition time or an edge configuration movement count between nodes.

6. The system of claim 5, wherein the first transition sequence is determined by identifying a first one of the nodes that corresponds with the current cabin mode and a second one of the modes that corresponds with the selected cabin mode.

7. The system of claim 6, wherein:

the first transition sequence is further determined by identifying a third one of the nodes that is determined to be a first intermediate transition step between the first node and the second node; and the first transition cost value is determined as a respective edge cost value between the first node and the third node.

8. The system of claim 7, wherein:

the first transition sequence is further determined by identifying a fourth one of the nodes that is determined to be a second intermediate transition step between the first node and the second node; and a second transition cost value is determined as a sum of respective edge cost values between the first node and the fourth node and between the fourth node and the second node.

9. The system of claim 1, wherein:

at least one of the moveable interior components is a vehicle seat being:

movable along a track within the vehicle so as to be moveable between the predetermined locations associated with each of the plurality of cabin modes; and rotatable about a base mounted on the track so as to be configurable between the predetermined configurations associated with each of the plurality of cabin modes.

10. The system of claim 8, further including:

a first actuator operably associated between the track and the base to move the vehicle seat along the track;

a second actuator operably associated between first and second portions of the vehicle seat to rotate the vehicle seat about the base;

wherein the first and second actuators are in electronic communication with the controller.

11. A system for controlling a reconfigurable seating arrangement in a vehicle, comprising:

a vehicle-human machine interface;

a memory storing a plurality of cabin modes characterized by a predetermined location and configuration for each of a plurality of moveable interior components within an interior of a vehicle, the plurality of cabin modes each being stored as nodes in a network model, the nodes being connected by edges extending between ones of the nodes selected as possible successive cabin modes, the network model further includes edge cost values associated with at least one of an edge transition time or an edge configuration movement count between nodes; and a controller in communication with the memory and the vehicle-human machine interface, the controller: receiving an indication of a selected one of the plurality of cabin modes from the vehicle-human machine interface; determining a first transition sequence between a current one of the cabin modes and the selected one of the cabin modes by identifying a first one of the nodes that corresponds with the current cabin mode and a second one of the nodes that corresponds with the selected cabin mode; and moving at least one of the moveable interior components in at least one of a location or a configuration according to the first transition sequence.

12. The system of claim 11, wherein the first transition sequence is further determined by identifying a third one of the nodes that is determined to be a first intermediate transition step between the first node and the second node.

13. The system of claim 12, wherein:

the network model further includes edge cost values associated with at least one of an edge transition time or an edge configuration movement count between nodes; and the first transition sequence is further determined by:

identifying a fourth one of the nodes that is determined to be a second intermediate transition step between the first node and the second node;

determining a first transition cost value as a respective edge cost value between the first node and the third node;

determining a second transition cost value as a respective edge cost value between the first node and the fourth node; and selecting the third node or the fourth node for inclusion in the first transition sequence based on the lower of the first transition cost value and the second transition cost value.

14. The system of claim 11, wherein the edges are determined based on:

a known path of travel for each of the plurality of moveable interior components during a change in at least one of location or configuration among a set of possible locations and configurations;

comparing the known paths of travel for selected ones of the plurality of moveable interior components responsive to a change in the at least one of location or configuration between the current configuration and the selected configuration; and eliminating potential transition sequences that include interference between the known paths of travel for selected ones of the plurality of moveable interior components.

15. A vehicle, comprising:

a reconfigurable seating arrangement within an interior of the vehicle, including a plurality of moveable interior components;

a vehicle-human machine interface;

a memory storing a plurality of cabin modes characterized by a predetermined location and configuration for each of the moveable interior components, the plurality of cabin modes each being stored as nodes in a network model, the nodes being connected by edges extending between ones of the nodes selected as possible successive cabin modes, the network model further includes edge cost values associated with a measurable value corresponding with a transition between nodes; and a controller in communication with the memory and the vehicle-human machine interface, the controller:

receiving an indication of a selected one of the plurality of cabin modes from the vehicle-human machine interface;

determining a first transition sequence between a current one of the cabin modes and the selected one of the cabin modes by identifying a first one of the nodes that corresponds with the current cabin mode and a second one of the nodes that corresponds with the selected cabin mode; and moving at least one of the moveable interior components in at least one of a location or a configuration according to the first transition sequence.

16. The vehicle of claim 15, wherein:

at least one of the moveable interior components is a vehicle seat being:

movable along a track within the vehicle so as to be moveable between the predetermined locations associated with each of the plurality of cabin modes; and rotatable about a base mounted on the track so as to be configurable between the predetermined configurations associated with each of the plurality of cabin modes.

17. The vehicle of claim 16, further including:

a first actuator operably associated between the track and the base to move the vehicle seat along the track;

a second actuator operably associated between the base and an upper portion of the vehicle seat to rotate the vehicle seat about the base;

wherein the first and second actuators are in electronic communication with the controller.

18. The vehicle of claim 15, wherein the first transition sequence is further determined by identifying a third one of the nodes that is determined to be a first intermediate transition step between the first node and the second node.

19. The vehicle of claim 18, wherein:

the network model further includes edge cost values associated with at least one of an edge transition time or an edge configuration movement count between nodes; and the first transition sequence is further determined by:

identifying a fourth one of the nodes that is determined to be a second intermediate transition step between the first node and the second node;

determining a first transition cost value as a respective edge cost value between the first node and the third node;

determining a second transition cost value as a respective edge cost value between the first node and the fourth node; and selecting the third node or the fourth node for inclusion in the first transition sequence based on the lower of the first transition cost value and the second transition cost value.

20. The vehicle of claim 15, wherein the edges are determined based on:

a known path of travel for each of the plurality of moveable interior components during a change in at least one of location or configuration among a set of possible locations and configurations;

comparing the known paths of travel for selected ones of the plurality of moveable interior components responsive to a change in the at least one of location or configuration between the current configuration and the selected configuration; and eliminating potential transition sequences that include interference between the known paths of travel for selected ones of the plurality of moveable interior components.

* * * * *